United States Patent Office 2,890,987
Patented June 16, 1959

2,890,987

STICK-FORM ASTRINGENT COMPOSITIONS

Harry Hilfer, Port Washington, N.Y., assignor, by mesne assignments, to Witco Chemical Company, Inc., New York, N.Y., a corporation of Delaware No Drawing. Application April 14, 1954
Serial No. 423,211

11 Claims. (Cl. 167—90)

My invention relates to the preparation of astringent, antiperspirant and deodorant compositions in the form or shape of sticks, pencils, cylinders, rods and the like, hereafter, for convenience, all referred to generically as stick-form astringent compositions.

It has heretofore been well known practice to prepare various cosmetics in stick form, as, for example, cologne sticks, which are usually made by forming a solution of a normally solid soap, such as sodium stearate, in an alcoholic or hydro-alcoholic solution containing oleaginous material or unctuous material, pouring the resulting warm liquid into molds and cooling to room temperature. During the cooling period gelation takes place and the resulting product assumes a rigid form which, at the same time, is capable of application to the human skin by gentle rubbing as a result of which a thin film containing the composition is deposited on the desired areas of the skin. Such a procedure, however, is not applicable to the formation of stick-form astringent compositions, particularly, where such compositions have a relatively high degree of acidity, as results from the utilization of such astringent aluminum compounds as aluminum chloride; aluminum sulfate; basic aluminum chlorides, of the type which range from 1/3 basic to 5/6 basic, typical illustrations of which are shown in U.S. Patent No. 2,196,016, one of which basic aluminum chlorides is sold under the trademark "Chlorhydrol."

Such astringent aluminum compounds are not compatible with soaps and, therefore, the latter cannot be used in connection with the preparation of such astringent compositions. Whereas astringent aluminum compounds of the type mentioned above, as well as others hereafter mentioned, are in general use in antiperspirant compositions, such as creams, solutions and lotions, heretofore known techniques such as that referred to above for the preparation of stick-form cosmetic preparations, utilizing soaps are, as stated above, unsuitable when utilized in connection with the production of such astringent compositions. The result is that numerous other approaches have been suggested, many of which are based upon emulsion techniques and which, therefore, leave much to be desired with respect to such aspects as emulsion stability, evaporation, shelf life and the like.

In accordance with my present invention, marked improvements have been made in the production of stick-form deodorants or astringents, the resulting products being stable, having excellent shelf life, being highly effective for astringent purposes, and being simple to manufacture as well as simple to apply to skin areas.

In accordance with my invention, a relatively strong, preferably substantially concentrated, hot aqueous solution of the astringent compound, particularly an astringent aluminum compound of the class consisting of aluminum chloride, aluminum sulfate, and basic aluminum chlorides, or mixtures thereof, is admixed with a preferably hot or heated aliphatic polyhydric alcohol, in the form of an alkylene polyhdric alcohol, in which said astringent solution is soluble or essentially soluble. In addition, there is admixed in such solution a higher molecular weight normally solid fatty acid amide of an alkylolamine and, desirably, a humectant. Small proportions of acid-stable organic surface active agents or wetting agents can also be utilized but their use is entirely optional and, where used, they function for the same purposes as wetting agents of the type which have heretofore been utilized in astringent preparations. After mixing the aforementioned ingredients at elevated temperature but below 100 degrees C. to form a homogeneous product which, in its particularly preferred form, comprises a relatively clear solution, the mixture is poured into molds or the like and allowed to cool whereupon it solidifies to a rigid stick-form consistency and, generally, depending upon the particular ingredients employed, assumes a whitish opaque appearance.

The astringent compound, as previously indicated, is most advantageously one or more of the aforementioned selected aluminum compounds. Other astringent compounds, in the form of metal astringent compounds, can, however, be utilized, so long as those which are selected are soluble, in the form of aqueous solutions thereof, in the alkylene polyhydric alcohol which forms one of the essential ingredients of the stick-form astringent compositions of my present invention. Typical metal astringent compounds other than those mentioned above are, for instance, basic aluminum formate, aluminum lactate, aluminum sulfocarbolate, aluminum sulfamate, aluminum acetotartrate, zinc chloride, ferric chloride, and the like. The metal astringent compound should be present, in the finished stick-form astringent composition, in proportions usually in the range of about 5% to about 25%, by weight, with a good average being from about 15% to about 20%, particularly in the case of the preferred astringent aluminum compounds.

Of the alkylene polyhydric alcohols which are used in accordance with my invention and in which the aqueous astringent solution or compound is dissolved, I have found that propylene glycol is outstandingly satisfactory, particularly when used in conjunction with aluminum chloride, aluminum sulfate, or basic aluminum chlorides, or mixtures thereof, as the astringent compound. Other alkylene polyhydric alcohols which can be employed are ethylene glycol, diethylene glycol, butylene glycol, and various other glycols such as the higher polyethylene glycols and polypropylene glycols. In general, however, the polyglycols of higher molecular weight or increasing chain length become less satisfactory due to the fact that their solvent action in relation to aqueous solutions of the astringent compounds tends to decrease with increasing molecular weight. The alkylene polyhydric alcohols can be either solid or liquid at room temperature but it is particularly desirable, for purposes of the present invention, that they be liquid. In general, the alkylene polyhydric alcohol will be present in proportions of about 15% to about 40%, by weight, of the astringent composition, with a preferred range being about 20% to about 35%, particularly in the case of the propylene glycol.

The normally solid higher fatty acid amides of alkylolamines can be derived by the usual condensation, at somewhat elevated temperatures, for instance, 150 to 175 degrees C., of normally solid higher fatty acids (or other higher fatty acid acylating compounds) such as palmitic acid, stearic acid, myristic acid, lauric acid, and the like, with primary or secondary alkylolamines or hydroxyalkyl amines, namely those which contain one or more hydroxy groups and, in addition, at least one primary or secondary amino group. Illustrative examples of such alkylolamines or hydroxyalkyl amines are, for instance, monoethanolamine, diethanolamine, n-propanolamine, monoisopropanolamine, diisopropanolamine, hydroxyethyl ethylenediamine, glycerolamine; 1-amino-2,3-propanediol; and 2-amino-1,3-propanediol. It will be noted that the alkylol groups present in said alkylolamines or hydroxyalkyl amines contain from 2 to 3 carbon atoms. I have found, for purposes of my present invention, that condensation products of myristic acid, palmitic acid, or stearic acid with monoethanolamine are especially satisfactory, the stearic ethanolamide being particularly useful. It will, of course, be understood that, in commercial practice, mixtures of higher molecular weight normally solid fatty acids (or sources thereof) and commercial mixtures of any two or more of the alkylolamines can be utilized. The normally solid alkylolamides are employed in proportions of about 10% to about 35%, by weight, with a preferred range being about 20% to about 30%.

It is desirable, at least in most instances, to include a humectant as one of the ingredients of the astringent composition. While the alkylene polyhydric alcohol, such as propylene glycol, in itself possesses humectant properties, I prefer to employ an additional humectant, particularly glycerol or sorbitol. In those cases where a humectant is utilized, it is employed in proportions of about 5% to about 20%, by weight, usually in the range of about 10% to about 15%.

The amount of water present in the stick-form astringent compositions is variable, depending, among other things, on the amount of the astringent compound employed. In general, water should be present in sufficient proportions so as to form a strong, particularly a saturated or a substantially saturated, solution of the astringent compound utilized. The water will, in most cases, be employed in proportions from about 10% to about 40%, by weight, and ordinarily in the range of about 10% to about 25%. Generally speaking, the greater the proportion of propylene glycol or other alkylene polyhydric alcohol used in the formation, the less water may be employed.

The following examples are illustrative of stick-form astringent compositions made in accordance with the present invention. It will be understood that other examples can readily be evolved in the light of the teachings contained herein, and, therefore, the examples are not to be construed as in any way limitative of the full scope of the invention.

Example 1: Percent by weight
Stearic acid monoethanolamide _____ 25
Propylene glycol _____ 35
Glycerol _____ 10
Aluminum chlorohydrate ("Chlorhydrol") ____ 15
Water _____ 15

Example 2:
Stearic acid monoethanolamide _____ 25
Propylene glycol _____ 30
Glycerol _____ 10
AlCl$_3$.6H$_2$O _____ 20
Water _____ 15

Example 3:
Myristic acid monoethanolamide _____ 30
Propylene glycol _____ 25
Glycerol _____ 15
Aluminum chlorohydrate ("Chlorhydrol") ____ 15
Water _____ 15

Example 4:
Stearic acid monoisopropanolamide _____ 25
Propylene glycol _____ 30
Sorbitol _____ 12
Aluminum sulfate _____ 15
Water _____ 18

Example 5:
Palmitic acid monoethanolamide _____ 30
Propylene glycol _____ 34
Aluminum chlorohydrate ("Chlorhydrol") ____ 18
Water _____ 18

Example 6:
Stearic acid monoethanolamide _____ 26
Propylene glycol _____ 34
Glycerol _____ 10
Aluminum chlorohydrate ("Chlorhydrol") ____ 12
AlCl$_3$.6H$_2$O _____ 3
Water _____ 15

Example 7:
Stearic acid monoethanolamide _____ 15
Stearic acid monoisopropanolamide _____ 10
Propylene glycol _____ 35
Glycerol _____ 9.5
Alum _____ 15
Water _____ 15
Lauryl sodium sulfate _____ 0.5

Example 8:
Stearic acid monoethanolamide _____ 25
Diethylene glycol _____ 35
Glycerol _____ 10
Aluminum chlorohydrate ("Chlorhydrol") ____ 15
Water _____ 15

What I claim as new and desire to protect by Letters Patent of the United States is:

1. In a method of making a stick-form astringent composition for body use, the steps which comprise admixing together a strong hot aqueous solution of a metallic astringent compound with a hot alkylene polyhydric alcohol in which said solution is essentially soluble, and a higher molecular weight normally solid fatty acid amide of an alkylolamine in which the fatty acid radical contains at least 12 carbon atoms, the alkylol groups of said alkylolamine containing from 2 to 3 carbon atoms, and effecting cooling of the mixture to produce a solid body, said composition containing from about 5% to about 25% of said astringent compound, from about 15% to about 40% of said alkylene polyhydric alcohol, from about 10% to about 35% of said amide, and from about 10% to about 40% of water, said percentages being by weight of the total composition, the aforesaid ingredients in the proportions recited producing said stick-form astringent composition.

2. In a method of making a stick-form astringent composition for body use, the steps which comprise admixing together a substantially concentrated hot aqueous solution of an astringent aluminum compound with a hot alkylene polyhydric alcohol in which said solution is essentially soluble, a higher molecular weight normally solid fatty acid amide of an ethanolamine in which the fatty acid radical contains at least 12 carbon atoms, and a humectant selected from the group consisting of glycerol and sorbitol, and effecting cooling of the mixture to produce a solid body, said composition containing from about 5% to about 25% of said astringent aluminum compound, from about 15% to about 40% of said alkylene polyhydric alcohol, from about 5% to about 20% of said humectant, from about 10% to about 35% of said amide, and from about 10% to about 40% of water, said percentages being by weight of the total composition, the aforesaid ingredients in the proportions recited producing said stick-form astringent composition.

3. In a method of making a stick-form astringent composition for body use, the steps which comprise admixing together a substantially concentrated hot aqueous solution of at least one astringent aluminum compound selected from the group consisting of aluminum sulfate, aluminum chloride and basic aluminum chlorides, with hot propylene glycol to produce a solution, a normally solid ethanolamide of a higher molecular weight normally solid fatty acid in which the fatty acid radical contains at least 12 carbon atoms, and a humectant selected from the group consisting of glyceral and sorbitol, and effecting cooling of the mixture to produce a solid body, said composition containing from about 15% to about 20% of said astringent aluminum compound, from about 20% to about 35% of the propylene glycol, from about 10% to about 15% of said humectant, from about 20% to about 30% of said amide, and from about 10% to about 25% of water, said percentages being by weight of the total composition, the aforesaid ingredients in the proportions recited producing said stick-form astringent composition.

4. In a method of making a stick-form astringent composition for body use, the steps which comprise admixing, at elevated temperature but below 100 degrees C., propylene glycol, water, an astringent aluminum compound, a humectant selected from the group consisting of glycerol and sorbitol, and a molten higher molecular weight normally solid fatty acid amide of an alkylolamine in which the fatty acid radical contains at least 12 carbon atoms, the alkylol groups of said alkylolamine containing from 2 to 3 carbon atoms, and effecting cooling of the mixture to a solid body, said composition containing from about 15% to about 40% of the propylene glycol, from about 10% to about 40% of water, from about 5% to about 25% of said astringent aluminum compound, from about 5% to about 20% of said humectant, and from about 10% to about 35% of said amide, said percentages being by weight of the total composition, the aforesaid ingredients in the proportions recited producing said stick-form astringent composition.

5. The method of claim 2, wherein said astringent aluminum compound is at least one compound selected from the group consisting of aluminum chloride, aluminum sulfate, and basic aluminum chlorides; and wherein said amide is a monoethanolamide.

6. An astringent composition in stick form containing a water-soluble metallic salt astringent, a normally solid higher fatty acid amide of an alkylolamine in which the fatty acid radical contains at least 12 carbon atoms, the alkylol groups of said alkylolamine containing from 2 to 3 carbon atoms, a water-soluble alkylene polyhydric alcohol in which aqueous solutions of said astringent are soluble, and water, said composition containing from about 5% to about 25% of said astringent, from about 15% to about 40% of said alkylene polyhydric alcohol, from about 10% to about 35% of said amide, and from about 10% to about 40% of water, said percentages being by weight of the total composition, the aforesaid ingredients in the proportions recited producing said stick-form astringent composition.

7. An astringent composition in stick form containing a water-soluble metallic astringent compound, a normally solid higher fatty acid amide of an alkylolamine in which the fatty acid radical contains at least 12 carbon atoms, the alkylol groups of said alkylolamine containing from 2 to 3 carbon atoms, propylene glycol, a water-soluble humectant selected from the group consisting of glycerol and sorbitol, and water, said composition containing from about 15% to about 20% of said astringent compound, from about 20% to about 30% of said amide, from about 20% to about 35% of said propylene glycol, from about 10% to about 15% of said humectant, and from about 10% to about 25% of water, said percentages being by weight of the total composition, the aforesaid ingredients in the proportions recited producing said stick-form astringent composition.

8. An astringent composition in stick form comprising essentially from about 5% to about 25% of an astringent aluminum salt, from about 15% to about 40% of an alkylene polyhydric alcohol in which aqueous solutions of said aluminum salt are soluble, from about 5% to about 20% of a humectant selected from the group consisting of glycerol and sorbitol, from about 10% to about 35% of a normally solid alkylolamide of an alkylolamine with a higher fatty acid in which the higher fatty acid radical contains at least 12 carbon atoms, the alkylol groups of said alkylolamine containing from 2 to 3 carbon atoms, and from about 10% to about 40% of water, said percentages being by weight of the total composition, the aforesaid ingredients in the proportions recited producing said stick-form astringent composition.

9. An astringent composition in stick form comprising essentially from about 15% to about 20% of at least one astringent aluminum compound selected from the group consisting of aluminum sulfate, aluminum chloride, and basic aluminum chlorides, from about 20% to about 35% of propylene glycol, from about 10% to about 15% of a humectant selected from the group consisting of glycerol and sorbitol, from about 20% to about 30% of a normally solid ethanolamide of a normally solid higher fatty acid in which the higher fatty acid radical contains at least 12 carbon atoms, and from about 10% to about 25% of water, the aforesaid ingredients in the proportions recited producing said stick-form astringent composition.

10. An astringent composition in stick form comprising essentially from about 15% to about 20% of an astringent aluminum salt, from about 20% to about 35% of propylene glycol, from about 10% to about 15% of glycerol, about 25% of an amide of a normally solid higher fatty acid containing from 14 to 18 carbon atoms with monoethanolamine, and about 15% of water, the aforesaid ingredients in the proportions recited producing said stick-form astringent composition.

11. An astringent composition in stick form comprising essentially from about 15% to about 20% of a metallic astringent salt, from about 20% to about 35% of an alkylene polyhydric alcohol in which aqueous solutions of said metallic astringent salt are soluble, from about 20% to about 30% of a normally solid ethanolamide of a normally solid higher fatty acid in which the fatty acid radical contains at least 12 carbon atoms, and from about 10% to about 25% water, the aforesaid ingredients in the proportions recited producing said stick-form astringent composition.

References Cited in the file of this patent

UNITED STATES PATENTS

| | | |
|---|---|---|
| 2,089,212 | Kritchevsky | Aug. 10, 1937 |
| 2,230,083 | Montenier | Jan. 28, 1941 |
| 2,368,075 | Wampner | Jan. 23, 1945 |
| 2,586,288 | Apperson | Feb. 19, 1952 |
| 2,617,757 | Neeley | Nov. 11, 1952 |

OTHER REFERENCES

Schimmel Briefs, Schimmel and Co., Inc., 601 W. 26th Street, N.Y., N.Y., No. 197, August 1951; No. 220, July 1953; No. 225, December 1953.